United States Patent
Tsai (10) Patent No.: US 10,890,201 B2
(45) Date of Patent: Jan. 12, 2021

(54) UPRIGHT SUPPORT BAR

(71) Applicant: JYIN SHENG CO., LTD., Huatan Township, Changhua County (TW)

(72) Inventor: Yu-Lung Tsai, Huatan Township, Changhua County (TW)

(73) Assignee: JYIN SHENG CO., LTD., Huatan Township, Changhua County (TW)

( * ) Notice: Subject to any disclaimer, the term of this patent is extended or adjusted under 35 U.S.C. 154(b) by 0 days.

(21) Appl. No.: 16/592,089

(22) Filed: Oct. 3, 2019

(65) Prior Publication Data
US 2020/0124072 A1 Apr. 23, 2020

(30) Foreign Application Priority Data

Oct. 18, 2018 (TW) .............................. 107136743 A (51) Int. Cl.
*F16B 7/10* (2006.01)
(52) U.S. Cl.
CPC ................ *F16B 7/105* (2013.01); *F16B 7/10* (2013.01)
(58) Field of Classification Search
USPC ..... 248/354.1, 354.3, 354.4, 354.7; 410/151, 410/143–149; 254/14–15, 105–106, 247, 254/249, 93 R
See application file for complete search history.

(56) References Cited

U.S. PATENT DOCUMENTS

| | | | | |
|---|---|---|---|---|
| 5,769,580 A | * | 6/1998 | Purvis | B60P 7/15 410/143 |
| 5,947,666 A | * | 9/1999 | Huang | B60P 7/15 410/143 |
| 5,988,963 A | * | 11/1999 | Shiau | B60P 7/15 410/143 |
| 6,247,882 B1 | | 6/2001 | Huang | |
| 2006/0237617 A1 | * | 10/2006 | Dwello | F16M 11/28 248/354.3 |

FOREIGN PATENT DOCUMENTS

TW 553332 U 9/2003

* cited by examiner

*Primary Examiner* — Alfred J Wujciak
(74) *Attorney, Agent, or Firm* — Muncy, Geissler, Olds & Lowe, P.C.

(57) ABSTRACT

An upright support bar includes a mount disposed at the pivotal joint between an outer tube and an inner tube, a button pivoted to the mount and providing an actuation end, a finger grip and a latching portion so arranged that when the actuation end is biased downward, the latching portion is engaged in one of a series of holes of the inner tube, and a sliding block with a locking piece mounted on the mount movable relative to the mount between a first position where the locking piece is abutted against the finger grip to lock the button and a second position where the locking piece is released from the finger grip to unlock the button.

6 Claims, 8 Drawing Sheets

UPRIGHT SUPPORT BAR

BACKGROUND OF THE INVENTION

1. Field of the Invention

The present invention relates to a retractable support bar technology and more particular, to an upright support bar that has better positioning effect.

2. Description of the Related Art

Taiwan Patent No. 553332 discloses an improved retractable support bar positioning structure, which comprises an inner tube and an outer tube coupled together. The outer end of the outer tube and the outer end of the inner tube are respectively provided with a foot member. The foot members can be stopped between two planes (between the ceiling and the ground, or between two walls). The inner tube has a plurality of holes spaced along the length. A mount is disposed at the opposing inner end of the outer tube that receives the inner tube. An elastic button is mounted on the mount. The head of the elastic button can be engaged into one hole of the inner tube to lock the combined length of the inner tube and the outer tube. The retractable support bar can be used for the hanging an object (bike or other) to provide support.

In order to prevent the elastic button from being accidentally pressed to cause the inner tube to fall directly by its own weight without warning, which may cause pinching or hitting people, a safety ejector and a spring leaf are disposed under the elastic button. The large diameter portion of the safety ejector pin is placed between the elastic button and the spring leaf to keep the elastic button engaged with its head into the hole of the inner tube and to provide an insurance function that prevents the elastic button from being operated. However, the safety ejector must be fitted with a tension spring, but because of the small space, it is not easy to set the tension spring. Moreover, when the safety ejector is installed, the safety ejector is required to be pressed by one hand, and a tool must be used to drive a nut to complete the connection, which is quite time-consuming and labor-intensive.

In addition, the conventional retractable support bar has an interference buffering effect on the inner tube, so that the inner tube can be slowed down when falling, avoiding harm to the user. However, there are other ways to achieve this effect, not limited to the structure of this prior art design.

SUMMARY OF THE INVENTION

The present invention has been accomplished under the circumstances in view. It is the main object of the present invention to provide an upright support bar, which is easy to assemble and has better positioning effect.

It is another object of the present invention to provide an upright support bar, which has a structure for providing a buffering effect to the inner tube that is different from the prior art and provides a cushioning interference effect.

To achieve these and other objects of the present invention, an upright support bar comprises an outer tube, an inner tube, a mount, a button, a torsion spring, a pivot device, a sliding block and an elastic damping device. The outer tube has one end thereof terminating in a nesting end and an opposite end thereof locked with a foot member. The inner tube has one end thereof locked with a foot member and an opposite end thereof terminating in an insertion end. The insertion end of the inner tube is inserted into the nesting end of the outer tube so that the inner tube is movable in the outer tube. The inner tube has a plurality of holes spaced along the axis direction thereof. The mount is fastened to the nesting end of the outer tube at the pivotal joint between the outer tube and the inner tube, comprising two supporting pieces respectively disposed at two opposite sides thereof to support the inner tube therebetween and a receiving hole radially passing through the wall of said mount thereof. The button is shaped like a long handle, comprising an actuation end, a mounting through hole and a finger grip. The actuation end and the finger grip are respectively located at two opposite ends of the button. The actuation end is provided with a latching portion. The latching portion is engaged into one of the holes of the inner tube to lock the inner tube to the outer tube when the actuation end is biased downward. The mounting through hole is disposed between the actuation end and the finger grip and being set along the width of the button. The torsion spring is mounted in the mounting through hole. The pivot device is inserted through the two supporting pieces of the mount, the mounting through hole of the button and the torsion spring to secure the button to the mount for allowing the button to be turned about the pivot device when a force is applied to the finger grip. The sliding block comprises a locking piece. Further, the sliding block is mounted on the mount and movable relative to the mount between a first position where the locking piece is abutted against the button and a second position where the locking piece is away from the button. The elastic damping device is mounted in the receiving hole of the mount, comprising a steel ball and a spring. The spring has one end thereof stopped by the sliding block and an opposite end thereof stopped against the steel ball. The steel ball has a part of the surface thereof exposed outside the receiving hole and is kept engaged in one of the holes of the inner tube.

Thereby, the sliding block of the present invention can be moved on the mount between a first position and a second position so that the locking piece of the sliding block can be moved from the position in abutment against the finger grip of the button to a direction away from the button. When the locking piece is abutted against the button, the button is locked. Using the latching portion to engage in one of the holes of the inner tube achieves better positioning effect and can prevent the button from being touched and biased accidentally. Further, the sliding block is easy to set up and assemble. In addition, by the elastic action of the steel ball on the holes of the inner tube, an interference buffering effect during the elastic action can be provided, so that the inner tube can be slowly lowered when falling, without damaging the user.

DETAILED DESCRIPTION OF THE INVENTION

Referring to FIGS. 1-8, an upright support bar 10 in accordance with the present invention can be placed between the ceiling and the ground for hanging an object (bicycle or other.) (not shown).

Figure 1:
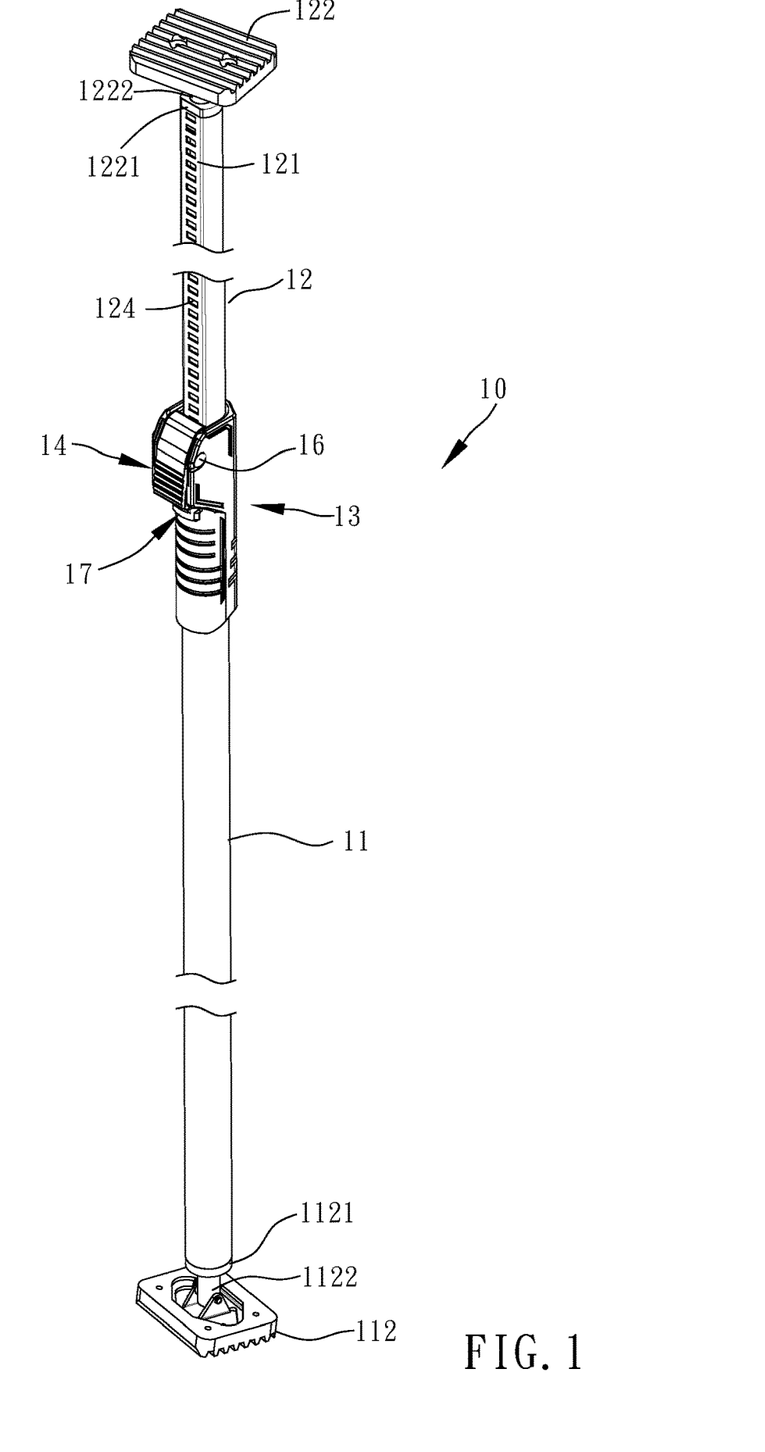
FIG. 1 is an oblique top elevational view of an upright support bar in accordance with the present invention.
Figure 2:
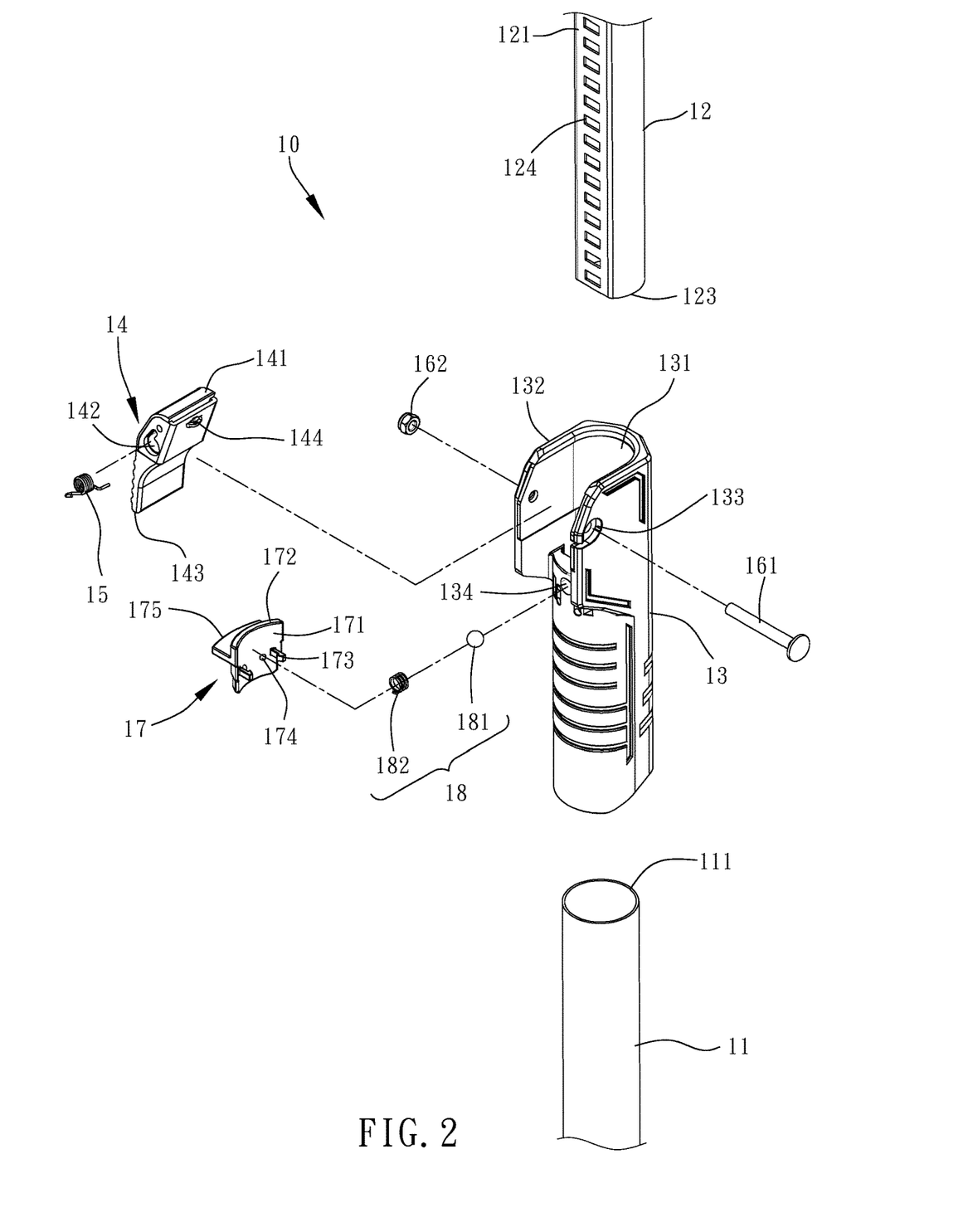
FIG. 2 is an exploded view of the upright support bar in accordance with the present invention.

The upright support bar 10 comprises an outer tube 11, an inner tube 12, a mount 13, a button 14, a torsion spring 15, a pivot device 16, a sliding block 17 and an elastic damping device 18.

The outer tube 11 is a long round tube, having one end thereof terminating in a nesting end 111 and an opposite end thereof mounted with a foot member 112. The foot member 112 is locked with the outer tube 11 by a plug 1121 and a screw rod 1122. Because it is a conventional knowledge and is not the main technical features of the present invention, it will not be described here.

The inner tube 12 is also a long round tube but has a flat surface 121. The inner tube 12 has one end thereof mounted with a foot member 122, and an opposite end thereof terminating in an insertion end 123. The inner tube 12 is inserted into the nesting end 111 of the outer tube 11 by the insertion end 123 so that the inner tube 12 can be moved in and out of the outer tube 11. The inner tube 12 has a plurality of holes 124 arranged on the flat surface 121 and spaced along the axial direction. These holes 124 are rectangular. Similarly, the foot member 122 is locked with the inner tube 12 by a plug 1221 and a screw rod 1222. The flat surface 121 and the holes 124 are of the known art and are not the main technical features of the present invention and will not described herein.

The mount 13 has a through hole 131 extending through two opposite ends thereof. One end of the mount 13 is fastened to the nesting end 111 of the outer tube 11 by the through hole 131. The other end of the mount 13 is provided with two supporting pieces 132. The two supporting pieces 132 protrude beyond the mount 13. The mount 13 is located at the pivotal joint between the inner tube 11 and the outer tube 12. The inner tube 12 is located between the two supporting pieces 132. Each of the two supporting pieces 132 has a perforation 133. The mount 13 is further provided with a receiving hole 134, two long holes 135, at least one first positioning recess 136 and at least one second positioning recess 137. The receiving hole 134 radially passes through the mount 13 and penetrates its wall. The two long holes 135 are located on two opposite sides relative to the receiving hole 134. Each long hole 135 has a convex portion 1351 protruded from the hole wall thereof (please refer to FIG. 5). The length direction of the two long holes 135 is parallel to the axial direction of the mount 13. The first positioning recess 136 and the second positioning recess 137 are in the shape of a circular groove. In the preferred embodiment of the present specification, two first positioning recesses 136 and two second positioning recesses 137 are provided and respectively disposed at two opposite sides relative to the receiving hole 134.

The button 14 is shaped like a long handle, having an actuation end 141, a mounting through hole 142, a finger grip 143. The actuation end 141 and the finger grip 143 are located at two opposite ends of the button 14. The actuation end 141 has a latching portion 144 protruding beyond the button 14. When the actuation end 141 is pivoted downward, the latching portion 144 can be snapped into one of the holes 124 of the inner tube 12 to lock the inner tube 12 to the outer tube 11. The mounting through hole 142 is disposed between the actuation end 141 and the finger grip 143. The mounting through hole 142 is set along the width of the button 14. The torsion spring 15 is mounted in the mounting through hole 142. The pivot device 16 comprises a pivot axle 161 and a nut 162. The pivot axle 161 is inserted through the perforation 133 of one supporting piece 132, the mounting through hole 142 of the button 14, the torsion spring 15 and the perforation 133 of the other supporting piece 132, and then fastened up with the nut 162 to secure the button 14 to the mount 13. When the finger grip 143 of the button 14 is stressed, the button 14 is turned about the pivot device 16.

Figure 6:
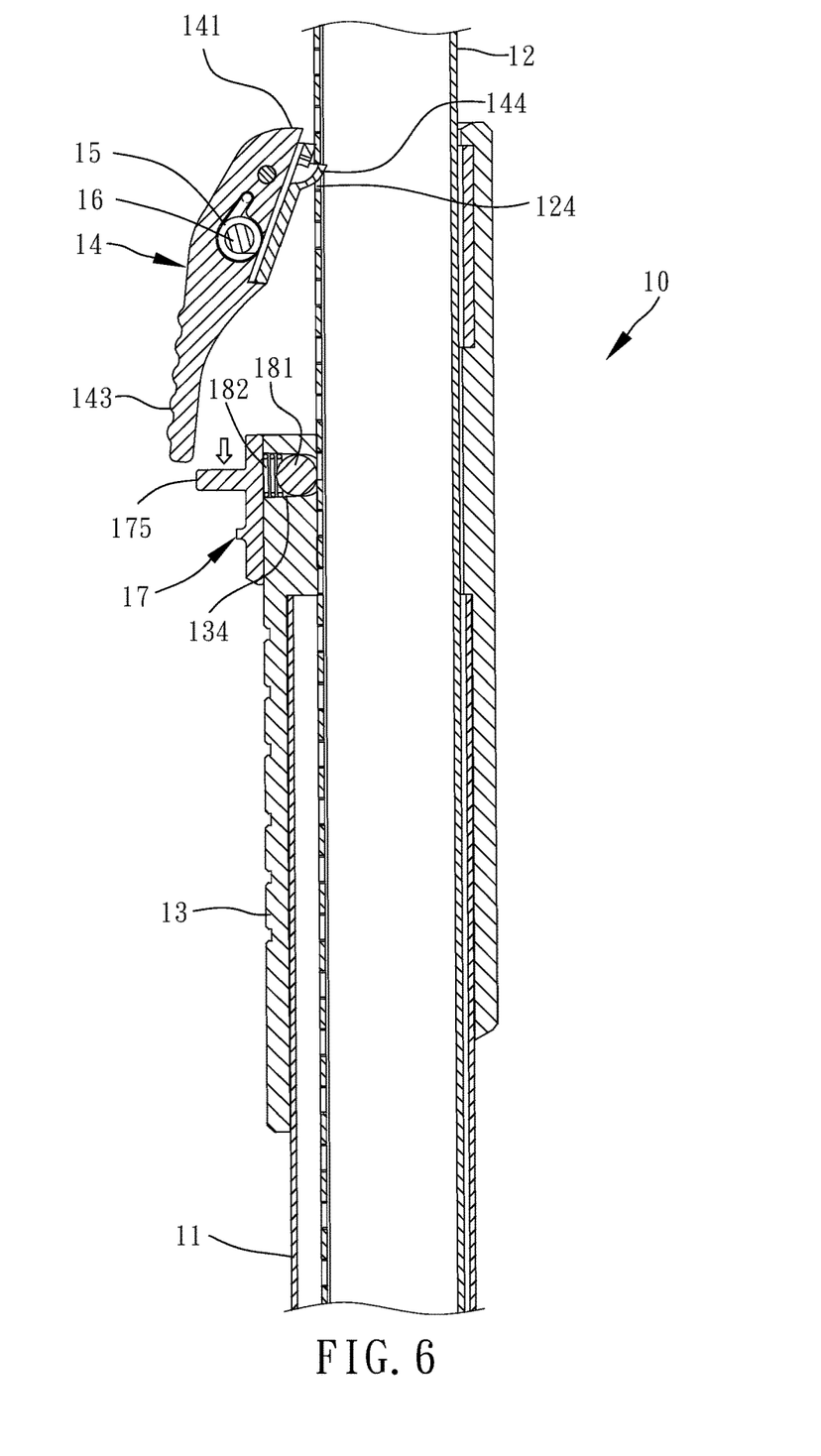
FIG. 6 is a schematic applied view of the present invention, illustrating the sliding block moved away from the button.
Figure 7:
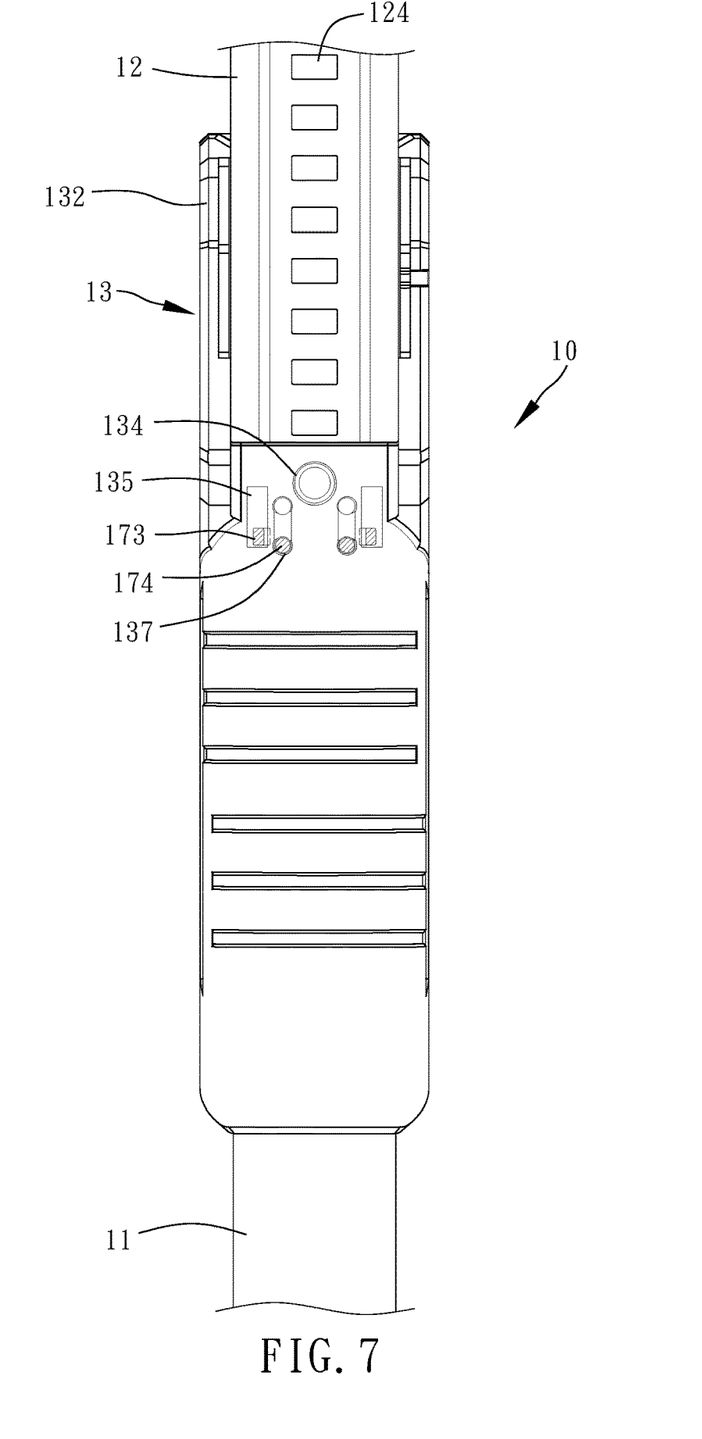
FIG. 7 is a schematic drawing illustrating the position of the positioning protrusion of the sliding block shown in FIG. 6.

The sliding block 17 is located on the mount 13. The sliding block 17 is an arched block, having an inner side 171 and an opposing outer side 172. The inner side 171 is concavely curved and is provided with two shanks 173 and at least one positioning protrusion 174. The two shanks 173 extend outward from the inner side 171. Each of the two shanks 173 has a hook portion 1731 at the distal end. The two shanks 173 can be inserted into the two long holes 135 of the mount 13, enabling the hook portion 1731 of each shank 173 to be hooked on the convex portion 1351 of the respective long hole 135 (please refer to FIG. 5). In the preferred embodiment of the present specification, two positioning protrusions 174 are provided corresponding to the two first positioning recesses 136 and the two second positioning recesses 137. The positioning protrusions 174 are semicircular bumps. When the positioning protrusions 174 are respectively engaged in the first positioning recesses 136, the sliding block 17 is in a first position (as shown in FIG. 4). When the positioning protrusions 174 are respectively engaged in the second positioning recesses 137, the sliding block 17 is in a second position (as shown in FIG. 7). Moreover, the sliding block 17 has a locking piece 175 disposed on the outer side 172. When the sliding block 17 is moved from the first position toward the second position, the locking piece 175 is moved with the sliding block 17 from the position abutted against the finger grip 143 of the button 14 (as shown in FIG. 3) in direction away from the button 14 (as shown in FIG. 6).

Figure 8:
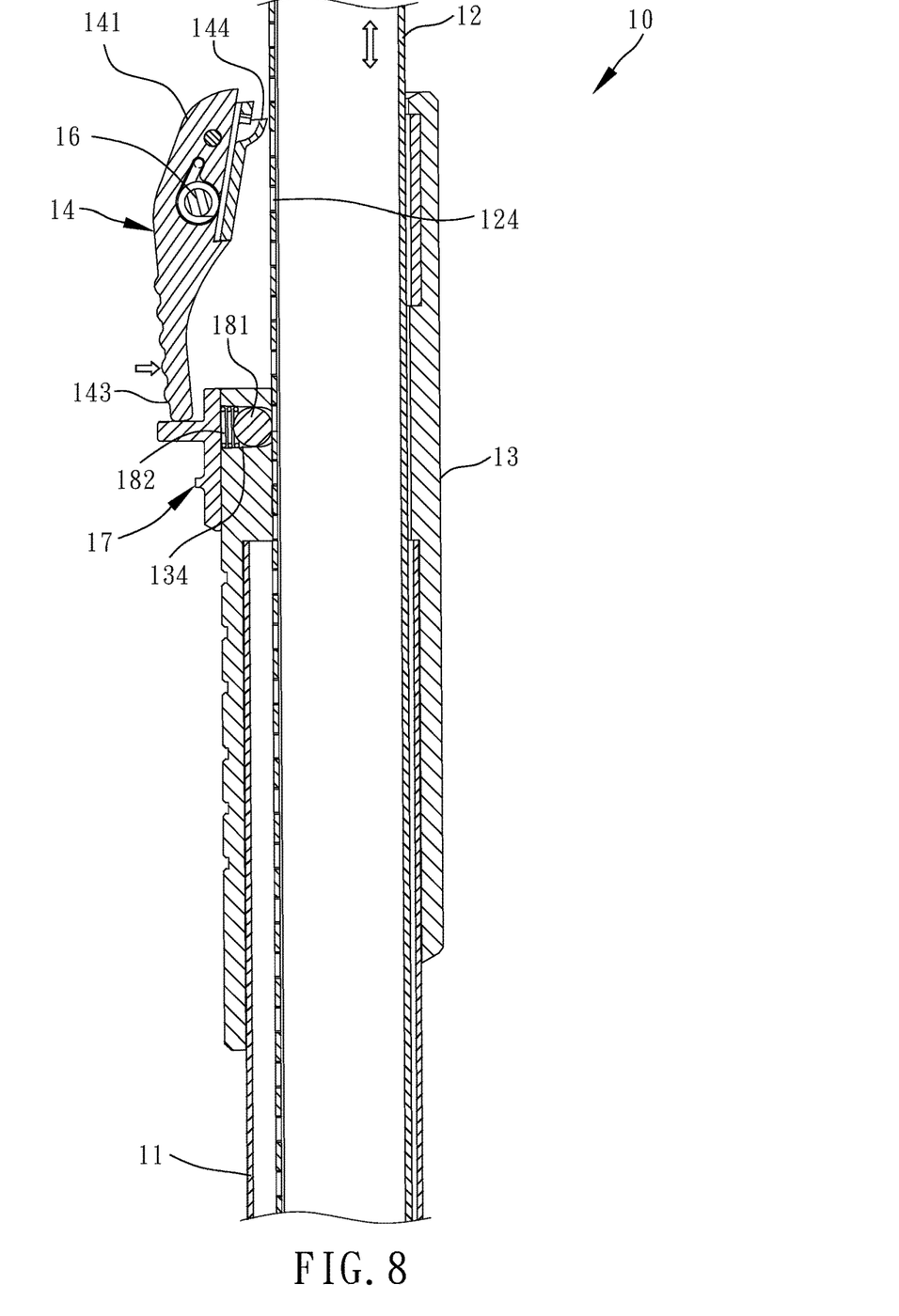
FIG. 8 is a schematic applied view of the present invention, illustrating the button pressed and the latching portion released from the inner tube.

The elastic damping device 18 comprises a steel ball 181 and a spring 182 and is mounted in the receiving hole 134 of the mount 13. The sliding block 17 blocks one end of the spring 182. The other end of the spring 182 is stopped against the steel ball 181. The diameter of one end of the receiving hole 134 close to the inner tube 12 is smaller than the outer diameter of the steel ball 181. A part of the surface of the steel ball 181 is exposed outside the receiving hole 134. When the inner tube 12 moves within the outer tube 11, a portion of the circumferential surface of the steel ball 181 is timely engaged in one of the holes 124 of the inner tube 12 (as shown in FIGS. 3, 6, and 8).

The structure of the present invention has been described above, and the operational state of the present invention will be described next.

Figure 3:
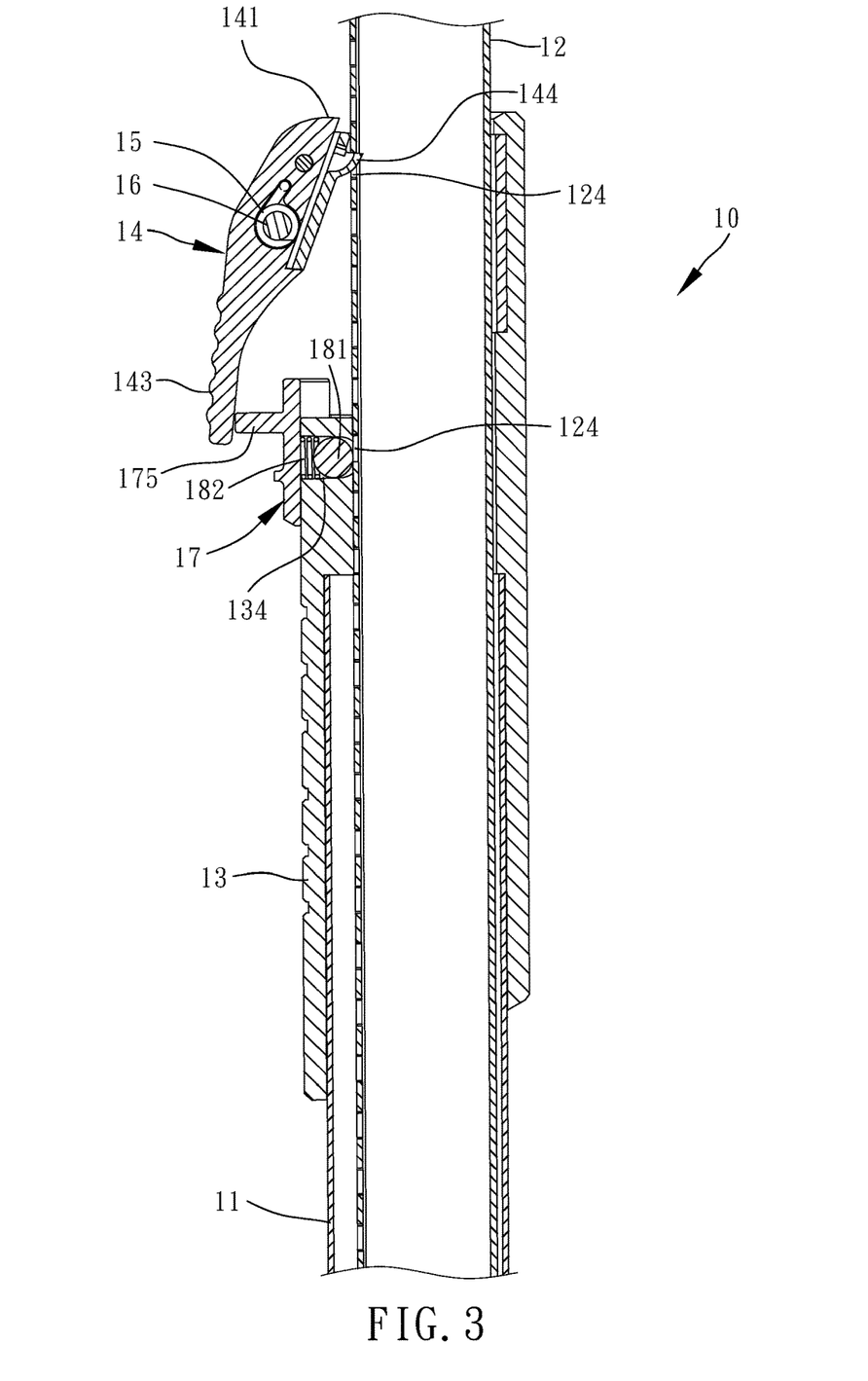
FIG. 3 is a schematic sectional side view of the present invention, illustrating the sliding block locked the button.
Figure 4:
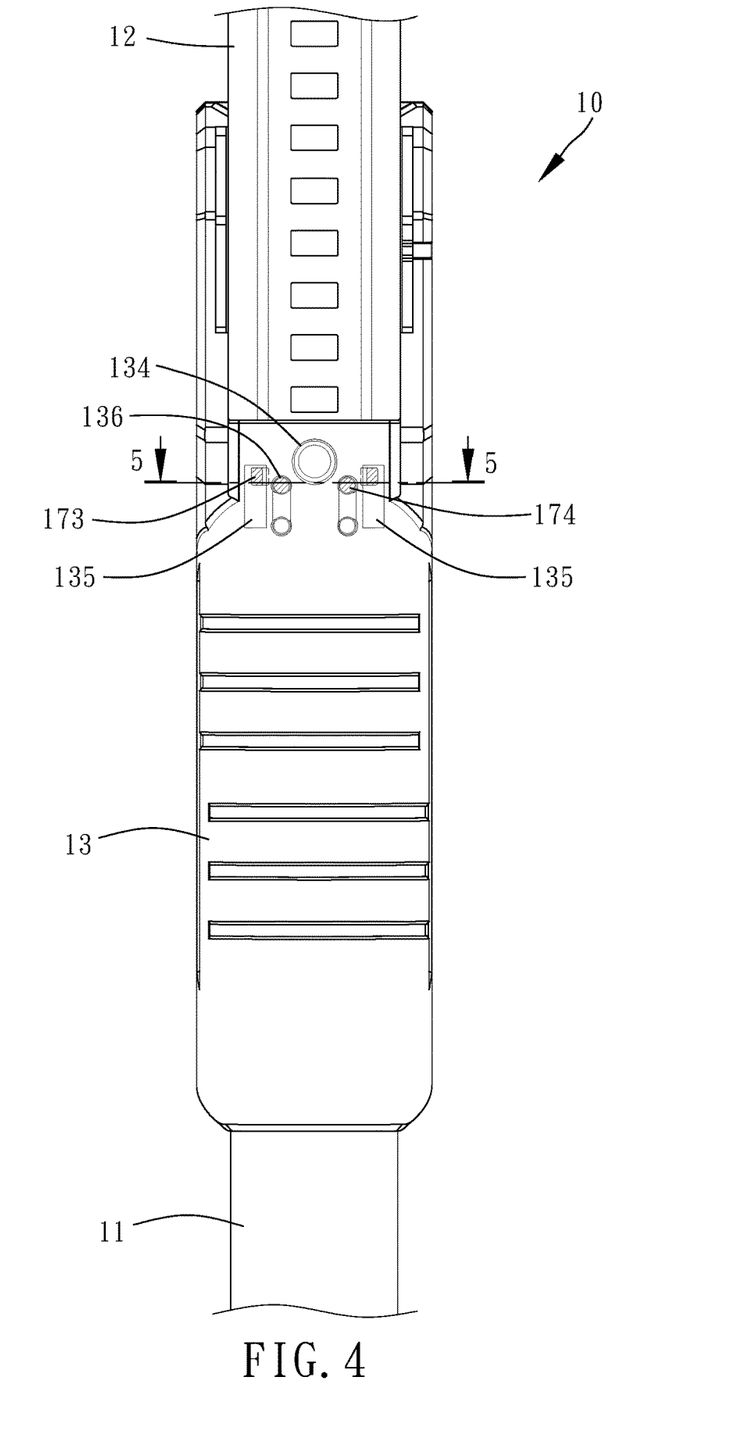
FIG. 4 is a schematic drawing illustrating the position of the positioning protrusion of the sliding block shown in FIG. 3.
Figure 5:
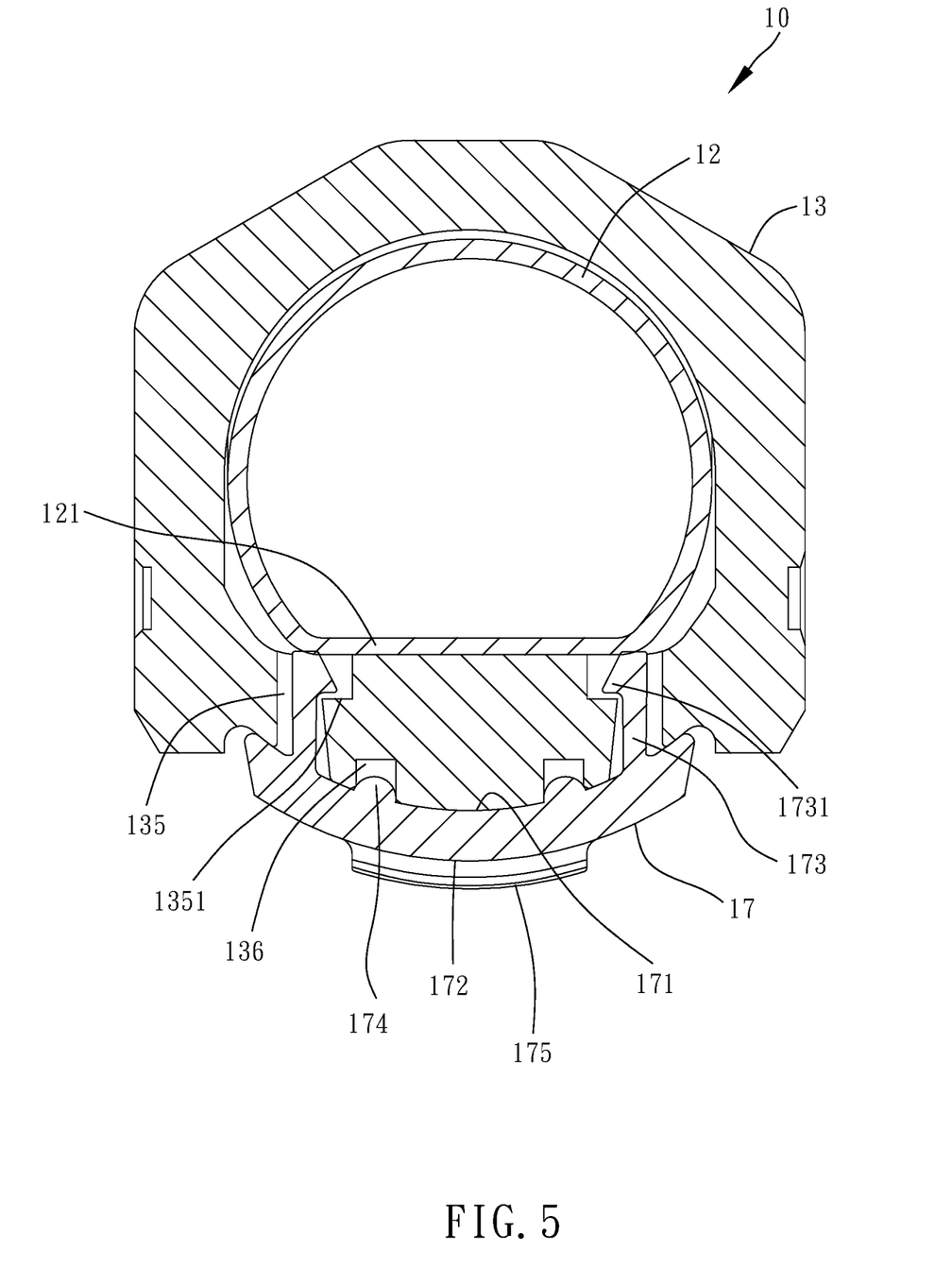
FIG. 5 is a sectional view taken along line 5-5 of FIG. 4.

With the above structure, in the actual operation, please refer to FIGS. 3 and 4, when the inner tube 12 is pulled to an appropriate length, the foot member 112 of the outer tube 11 and the foot member 122 of the inner tubes 12 are respectively abutted against the ceiling and the ground. At this point, the actuation end 141 of the button 14 is biased downward (the direction toward the inner tube 12) to engage the latching portion 144 into one of the holes 124 of the inner tube 12 to fix the total length of the upright support bar 10. Due to the effect of the torsion spring 15, the finger grip 143 of the button 14 pivots upward (in direction away from the mount 13), at which point the effect of positioning the inner tube 12 on the extended length is completed. In addition, if the button 14 is to be further locked, the user pushes the sliding block 17 to move, and the positioning protrusions 174 on the sliding block 17 are moved and engaged in the respective first positioning recesses 136, thereby locking the sliding block 17. At the same time, the locking piece 175 is moved with the sliding block 17 to extend under the finger grip 143 and to abut against the finger grip 143. In this way, the actuation end 141 of the button 14 and the finger grip 143 are both stopped in place, so that the button 14 cannot be pulled and pivoted. Thus, the button 14 is locked and prohibited from being accidentally touched, avoiding dropping of the inner tube 12 without warning, which may cause pinching or hitting people.

When it is desired to adjust the total length of the upright support bar 10 of the present invention, please refer to FIGS. 6 and 7 to unlock the sliding block 17 first. By pushing the sliding block 17 to bring the locking piece 175 away from the button 14, the locking piece 175 is released from the finger grip 143 of the button 14. At this time, the positioning protrusions 174 on the sliding block 17 move with the sliding block 17 from the first position to the second position and are engaged in the respective second positioning recesses 137 to lock the sliding block 17 in the second position. Thus, since the locking piece 175 is no longer abutted against the button 14, it can be biased when a force is applied to the finger grip 143. When the finger grip 143 is pressed downward (in direction toward the mount 13), as shown in FIG. 8, the button 14 is turned about the pivot device 16 to bias the actuation end 141 upward (in direction away from the inner tube 12), thereby disengaging the latching portion 144 from the hole 124 of the inner tube 12. Thus, the inner tube 12 is unlocked and forced by gravity to move downward in the outer tube 11. During the movement of the inner tube 12, the steel ball 181 of the elastic damping device 18 is forced by the spring 182 to act on each hole 124 of the inner tube 12, thereby providing an interference force acting on the inner tube 12 to slow the movement of the inner tube 12 within the outer tube 11 and to achieve a cushioning effect.

As can be seen from the above, the sliding block 17 is disposed outside the mount 13 and the locking piece 175 is provided at the sliding block 17, thus, when the sliding block 17 is moved to the position where the locking piece 175 is abutted against the finger grip 143 of the button 14, the button 14 is prohibited from being biased. In this way, the button 14 is prohibited from being accidentally touched, preventing the inner tube 12 from falling without warning, which may cause pinching or hitting people. Further, when the sliding block 17 is moved, the positioning protrusions 174 can be engaged into the respective first positioning recesses 136 or the respective second positioning recesses 137 to enhance the positioning effect. The sliding block 17 is easy to set up and assemble, and it can achieve the intended purpose of the invention. In addition, by the elastic action of the steel ball on the holes of the inner tube, the interference buffering effect during the elastic action can be provided, so that the inner tube can be slowly lowered when falling, without damaging the user. This interference buffering structure is different from the prior art.

What is claimed is:

1. An upright support bar, comprising:
    an outer tube having one end thereof terminating in a nesting end and an opposite end thereof locked with a foot member;
    an inner tube having one end thereof locked with a foot member and an opposite end thereof terminating in an insertion end, said insertion end of said inner tube being inserted into said nesting end of said outer tube so that said inner tube is movable in said outer tube, said inner tube comprising a plurality of holes spaced along the axis direction thereof;
    a mount fastened to said nesting end of said outer tube and located at a position where said outer tube and said inner tube are connected with each other, said mount comprising two supporting pieces respectively disposed at two opposite sides thereof to support said inner tube therebetween and a receiving hole radially passing through a wall of said mount thereof;
    a button shaped like a long handle and mounted on the mount, said button comprising an actuation end, a mounting through hole and a finger grip, said actuation end and said finger grip being respectively located at two opposite ends of said button, said actuation end being provided with a latching portion, said latching portion being engaged into one of said holes of said inner tube to lock said inner tube to said outer tube when said actuation end is biased downward, said mounting through hole being disposed between said actuation end and said finger grip and being set along the width of said button;
    a torsion spring mounted in said mounting through hole;
    a pivot device inserted through said two supporting pieces of said mount, said mounting through hole of said button and said torsion spring to secure said button to said mount for allowing said button to be turned about said pivot device when a force is applied to said finger grip;
    a sliding block comprising a locking piece, said sliding block being mounted on said mount and movable relative to said mount between a first position where said locking piece is abutted against said button and a second position where said locking piece being away from said button; and
    an elastic damping device mounted in said receiving hole of said mount, said elastic damping device comprising a steel ball and a spring, said spring having one end thereof stopped by said sliding block and an opposite end thereof stopped against said steel ball, said steel ball having a part of the surface thereof exposed outside said receiving hole and being kept engaged in one of said holes of said inner tube.

2. The upright support bar as claimed in claim 1, wherein said mount further comprises two long holes respectively disposed at two opposite sides relative to said receiving hole, each said long hole having a convex portion protruded from a hole wall thereof, the length direction of said two long holes being parallel to the axial direction of said mount; said sliding block is an arched block, defining an inner side and an opposing outer side, said inner side being concavely curved and provided with two shanks, said two shanks extending outward from said inner side, each said shank having a hook portion at a distal end thereof, said two shanks being insertable into said two long holes of said mount for enabling said hook portion of each said shank to be hooked on said convex portion of one respective said long hole; said locking piece is located on said outer side of said sliding block.

3. The upright support bar as claimed in claim 2, wherein said inner side of said sliding block is provided with a positioning protrusion; said mount further comprises a first positioning recess and a second positioning recess so arranged that when said sliding block is in said first position, said positioning protrusion is engaged in said first positioning recess; when said sliding block is in said second position, said positioning protrusion is engaged in said second positioning recess.

4. The upright support bar as claimed in claim 3, wherein said positioning protrusion is a semicircular bump; said first positioning recess and said second positioning recess are in the shape of a circular groove.

5. The upright support bar as claimed in claim 1, wherein the diameter of one end of said receiving hole close to said inner tube is smaller than the outer diameter of said steel ball.

6. The upright support bar as claimed in claim 1, wherein said mount has a through hole cut through two opposite ends thereof, one end of said mount being fastened to said nesting end of said outer tube by said through hole, the other end of said mount being provided with said two supporting pieces for the insertion of said insertion end of said inner tube in between said two supporting pieces into said through hole for coupling to said outer tube so that said inner tube is disposed between said two supporting pieces.

* * * * *